(12) United States Patent
Takeuchi et al.

(10) Patent No.: US 10,579,267 B2
(45) Date of Patent: Mar. 3, 2020

(54) MEMORY CONTROLLER AND MEMORY SYSTEM

(71) Applicant: Toshiba Memory Corporation, Minato-ku (JP)

(72) Inventors: Kazuaki Takeuchi, Kanagawa (JP); Yoshihisa Kojima, Kanagawa (JP); Norio Aoyama, Tokyo (JP); Mitsunori Tadokoro, Kanagawa (JP)

(73) Assignee: Toshiba Memory Corporation, Minato-ku (JP)

( * ) Notice: Subject to any disclaimer, the term of this patent is extended or adjusted under 35 U.S.C. 154(b) by 141 days.

(21) Appl. No.: 15/297,466

(22) Filed: Oct. 19, 2016

(65) Prior Publication Data

US 2017/0038971 A1 Feb. 9, 2017

Related U.S. Application Data

(63) Continuation of application No. 14/022,671, filed on Sep. 10, 2013, now Pat. No. 9,514,041.
(Continued)

(51) Int. Cl.
*G06F 13/12* (2006.01)
*G06F 13/38* (2006.01)
(Continued)

(52) U.S. Cl.
CPC ............ *G06F 3/061* (2013.01); *G06F 3/0614* (2013.01); *G06F 3/0659* (2013.01);
(Continued)

(58) Field of Classification Search
CPC .. G06F 3/0614; G06F 3/0659; G06F 12/0246; G06F 3/0679
(Continued)

(56) References Cited

U.S. PATENT DOCUMENTS 5,359,569 A 10/1994 Fujita et al.
6,032,188 A 2/2000 Mairs et al.
(Continued)

FOREIGN PATENT DOCUMENTS

| JP | 5-216775 | 8/1993 |
| JP | 2011-150433 | 8/2011 |
| JP | 2012-523594 | 10/2012 |

*Primary Examiner* — Chun Kuan Lee
(74) *Attorney, Agent, or Firm* — Oblon, McClelland, Maier & Neustadt, L.L.P.

(57) ABSTRACT

A memory controller according to the embodiment includes a front-end unit that issues an invalidation command in response to a command from outside of the memory controller, the command including a logical address, an address translation unit that stores a correspondence relationship between the logical and a physical address, an invalidation command processing unit that, when the invalidation command is received, registers the logical address associated with the invalidation command as an invalidation registration region in an invalidation registration unit and issues a notification to the front-end unit, and an internal processing unit that dissolves a correspondence relationship between the logical address registered in the invalidation registration unit and the physical address in the address translation unit in a predetermined order by referencing the logical address registered in the invalidation registration unit. The front-end unit transmits completion command which indicates the completion of the command in response to the notification.

17 Claims, 13 Drawing Sheets

Related U.S. Application Data

(60) Provisional application No. 61/775,267, filed on Mar. 8, 2013.

(51) Int. Cl.
*G06F 3/06* (2006.01)
*G06F 12/02* (2006.01)

(52) U.S. Cl.
CPC .......... *G06F 3/0679* (2013.01); *G06F 3/0688* (2013.01); *G06F 12/0246* (2013.01); *G06F 2212/7209* (2013.01)

(58) Field of Classification Search
USPC .......................................................... 710/62
See application file for complete search history.

(56) References Cited

U.S. PATENT DOCUMENTS

| | | | |
|---|---|---|---|
| 8,635,416 B1* | 1/2014 | de la Iglesia | G06F 3/061 |
| | | | 711/154 |
| 2010/0262979 A1 | 10/2010 | Borchers | |
| 2011/0231594 A1* | 9/2011 | Sugimoto | G06F 3/0616 |
| | | | 711/103 |
| 2011/0264884 A1* | 10/2011 | Kim | G06F 21/80 |
| | | | 711/170 |
| 2012/0066447 A1* | 3/2012 | Colgrove | G06F 3/061 |
| | | | 711/114 |
| 2013/0290608 A1 | 10/2013 | Nelogal et al. | |
| 2014/0013027 A1 | 1/2014 | Jannyavula Venkata | |
| 2014/0095767 A1 | 4/2014 | Trika et al. | |

\* cited by examiner

MEMORY CONTROLLER AND MEMORY SYSTEM

CROSS-REFERENCE TO RELATED APPLICATIONS

This application is a continuation of U.S. application Ser. No. 14/022,671 filed Sep. 10, 2013, and is based upon and claims the benefit of priority from Provisional Patent Application No. 61/775,267, filed on Mar. 8, 2013; the entire contents of each of which are incorporated herein by reference.

FIELD

Embodiments of the present invention relate to a memory controller and a memory system.

BACKGROUND

The UNMAP command is a command that requests data invalidation in a memory system, which is realized by dissolving the correspondence relationship between a logical address and a physical address corresponding thereto in the memory system for an indicated logical address. In addition to this, in the UNMAP command process, it is necessary to update various data, such as a valid cluster counter; therefore, the process takes time. If the range of the indicated logical address is wide, more time is needed.

This is because, for example, in an enterprise SSD, it is necessary to perform an operation of making management information nonvolatile and matching the management information per cluster so as to prevent, for example, information on the UNMAP command from being lost when the power fails, a nonvolatile memory unit from being worn out, and the write performance from degrading.

Conventionally, there is a problem in that after the UNMAP command for a wide range is input, other commands cannot be executed immediately. This is because the controller of the SSD does not respond until the internal processing for the UNMAP command is completed and therefore a subsequent command cannot be issued. Moreover, it takes a long time to perform the internal processing for executing the UNMAP command for a wide range.

DETAILED DESCRIPTION

Figure 1:
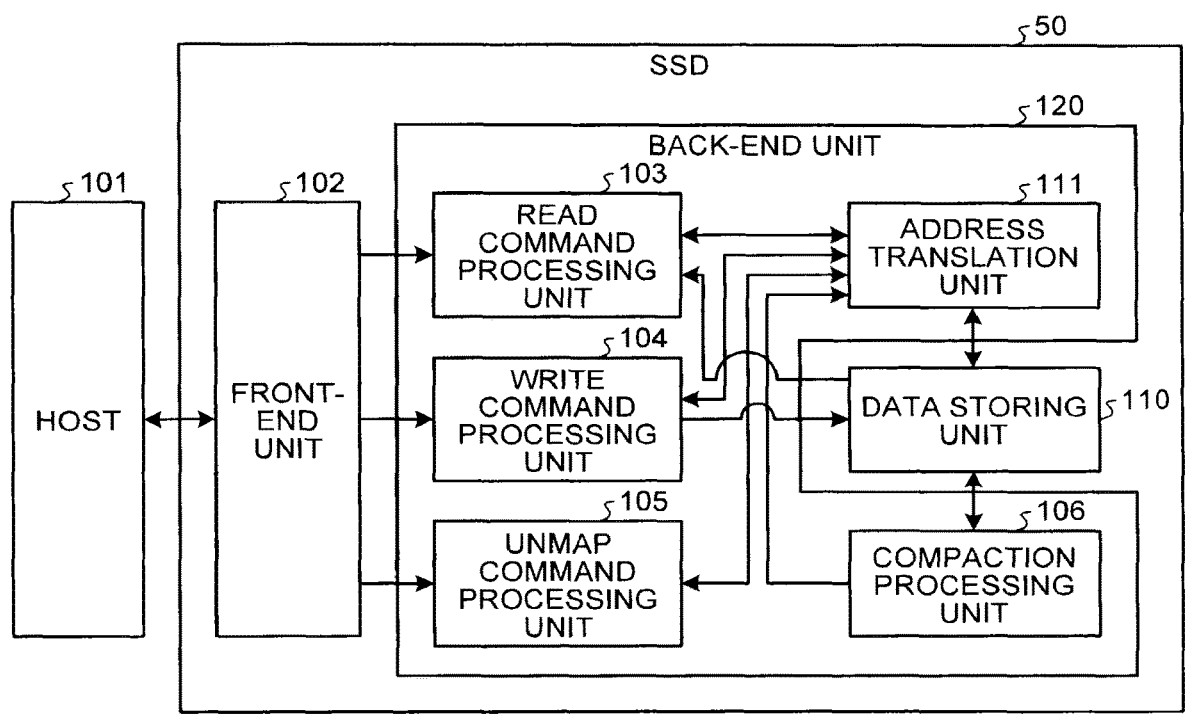
FIG. 1 is a diagram illustrating the configuration of an SSD and a host connected thereto according to an embodiment.

According to one embodiment of the present invention, a memory controller includes a front-end unit that issues an invalidation command in response to receiving a command from outside of the memory controller, the command including a logical address, an address translation unit that stores a correspondence relationship between the logical address and a physical address, an invalidation command processing unit that, when the invalidation command is received, registers the logical address associated with the invalidation command as an invalidation registration region in an invalidation registration unit and issues a completion notification to the front-end unit, and an internal processing unit that dissolves a correspondence relationship between the logical address registered in the invalidation registration unit and the physical address in the address translation unit in a predetermined order by referencing the logical address registered in the invalidation registration unit. The front-end unit transmits completion command which indicates the completion of the command in response to receiving the completion notification.

A memory controller and a memory system according the embodiment will be explained below in detail with reference to the accompanying drawings. The present invention is not limited to the embodiment.

Embodiment

First, terms used in the present embodiment are defined below.

Cluster: Management unit in an address translation table.
Block: Group of clusters erased at the same time in a nonvolatile semiconductor memory unit (data storing unit).
Logical address: Value that is attached per cluster and with which a host indicates a write position.
Physical address: Value that is attached per cluster and with which a write position in a storage area is indicated.
Region: Group of a predetermined number of consecutive logical addresses.
Address translation table (unit): Table that stores the correspondence between logical addresses and physical addresses per cluster.
Address resolution: To obtain a physical address from a provided logical address.

Address update: To update the address translation table such that a provided physical address can be obtained with respect to a provided logical address by the address resolution.

Valid cluster: Cluster in which an address obtained by performing the address resolution on a logical address is equal to a physical address.

Valid cluster determination: To determine whether each cluster included in a block is a valid cluster.

Valid cluster counter: Counter for each block that stores the number of clusters that are included in a block and are referred to by the address translation table. The counter being zero is a condition in which the block is released such that it becomes a free block.

Temporary invalid cluster: Cluster that is registered in a region UNMAP table (invalidation registration table) and can be referred to from the address translation table. The temporary invalid cluster is generated when registration is made in the region UNMAP table.

Invalid cluster: Cluster in which a physical address obtained by performing the address resolution on a logical address of each cluster included in a compaction source block is not equal to a physical address of a cluster.

In some cases, a host issues a command requesting data invalidation in a memory system to the memory system, such as an SSD (Solid State Drive). Specifically, the UNMAP command of the SCSI standard, the TRIM command of the ATA standard, commands for formatting a memory system, for performing sanitizing, for performing a key exchange in an encrypter, and the like are issued to the front-end of the memory system from the host. The data invalidation is to dissolve the correspondence relationship between a logical address and a physical address corresponding thereto for an indicated logical address. To dissolve the correspondence relationship between a logical address and a physical address means to cancel the correspondence relationship between the logical address and the physical address. The data invalidation is hereinafter referred to simply as invalidation (UNMAP).

When the front-end receives a command as described above from the host, the process of executing the UNMAP command (data invalidation command) is performed in the memory system. Specifically, in the back-end of the memory system, the process of executing the UNMAP command issued from the front-end is performed. In the present embodiment, as a condition in which the front-end issues the UNMAP command to the back-end, for example, an explanation is given of a case, as an example, where the UNMAP command is issued from the host to the front-end as per the SCSI standard.

In the present embodiment, the process for the UNMAP command in the memory system is divided into two stages, i.e., the reservation and the background process; therefore, even after the UNMAP command for a wide range is received, other commands can be immediately executed. The reservation is an operation of registering, as an uncompleted portion of the UNMAP command, a target region (invalidation registration region) for the UNMAP command in a region UNMAP table and returning a response to the host. In the background process, the internal processing for the UNMAP command is performed in the background. At this point, the portion in which the internal processing for the UNMAP command is completed is deregistered. When the subsequent command accesses an uncompleted portion of the internal processing for the UNMAP command, the internal processing for the UNMAP command is preferentially performed on the region that is accessed; therefore, the command subsequent to the UNMAP command can be executed without waiting for the completion of the UNMAP command. Specifically, the process as follows is performed.

When the READ command is sent from the host, if the target area for the READ command is included in an uncompleted portion of the invalidation by the UNMAP command, a response that indicates that the area is an invalidated area is returned.

When the Write command is sent from the host, the Write command is processed after completing the process on an uncompleted portion included in the target range for the WRITE request preferentially over an uncompleted portion of the background process. The time required for performing the invalidation process only on the target portion for the WRITE command in the uncompleted portion is shorter than the time required for performing the invalidation process on the whole uncompleted portion. Therefore, the processing time for the WRITE command can be reduced.

When the power fails, information on a portion of which invalidation has not been completed is made nonvolatile. When the power is restarted, the information on the uncompleted portion is restored and the internal processing is resumed. Consequently, even if the power fails, execution of the internal processing in the registered range is ensured.

FIG. 1 is a diagram illustrating the configuration of an SSD 50 that is a memory system and a host 101 connected thereto according to the present embodiment. The SSD 50 includes a front-end unit 102 that includes a host interface, a back-end unit 120 that performs a command execution process that includes accessing a NAND memory, and a data storing unit 110 that is a NAND memory. The controller of the SSD 50 includes the front-end unit 102 and the back-end unit 120. The back-end unit 120 includes a READ command processing unit 103, a WRITE command processing unit 104, an UNMAP command processing unit 105 (invalidation command processing unit), a compaction processing unit 106, and an address translation unit 111.

Figure 2:
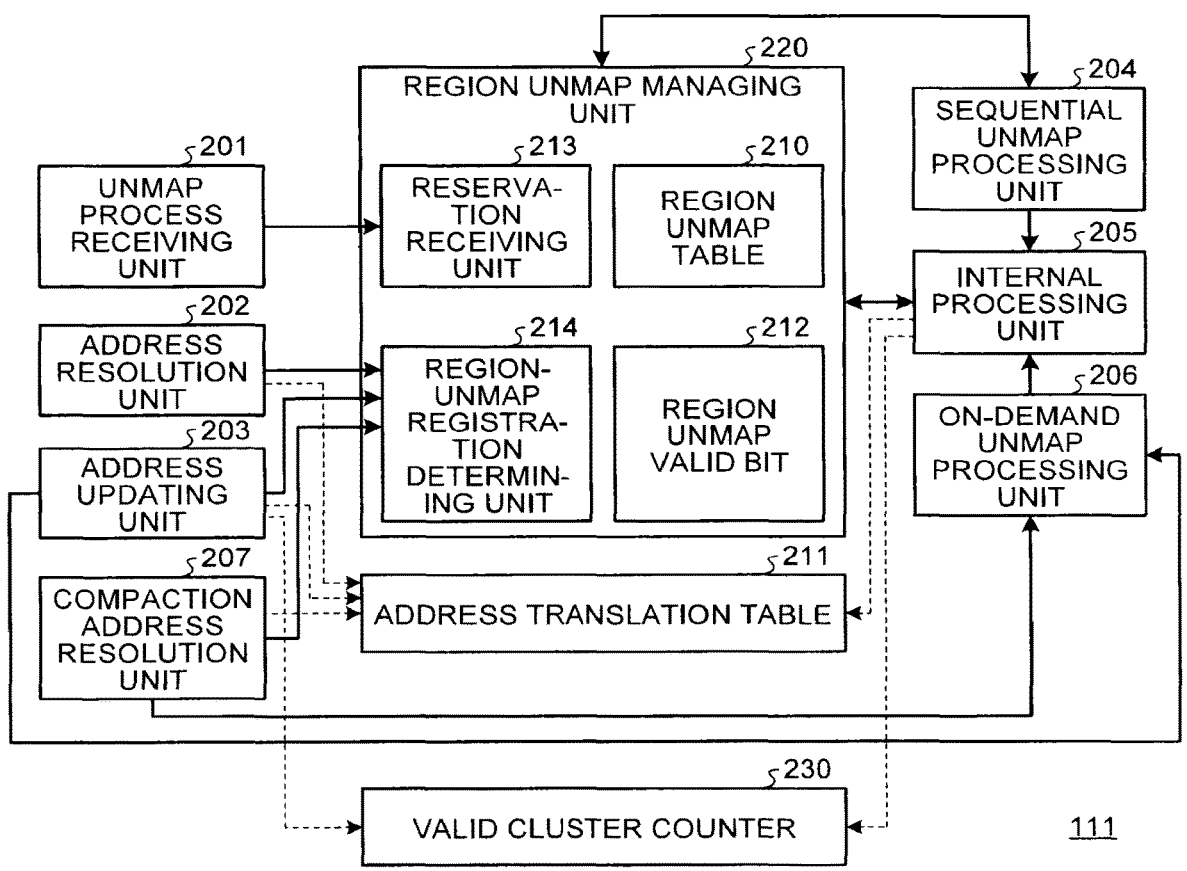
FIG. 2 is a block diagram illustrating the detailed configuration of an address translation unit according to the embodiment.
Figure 3:
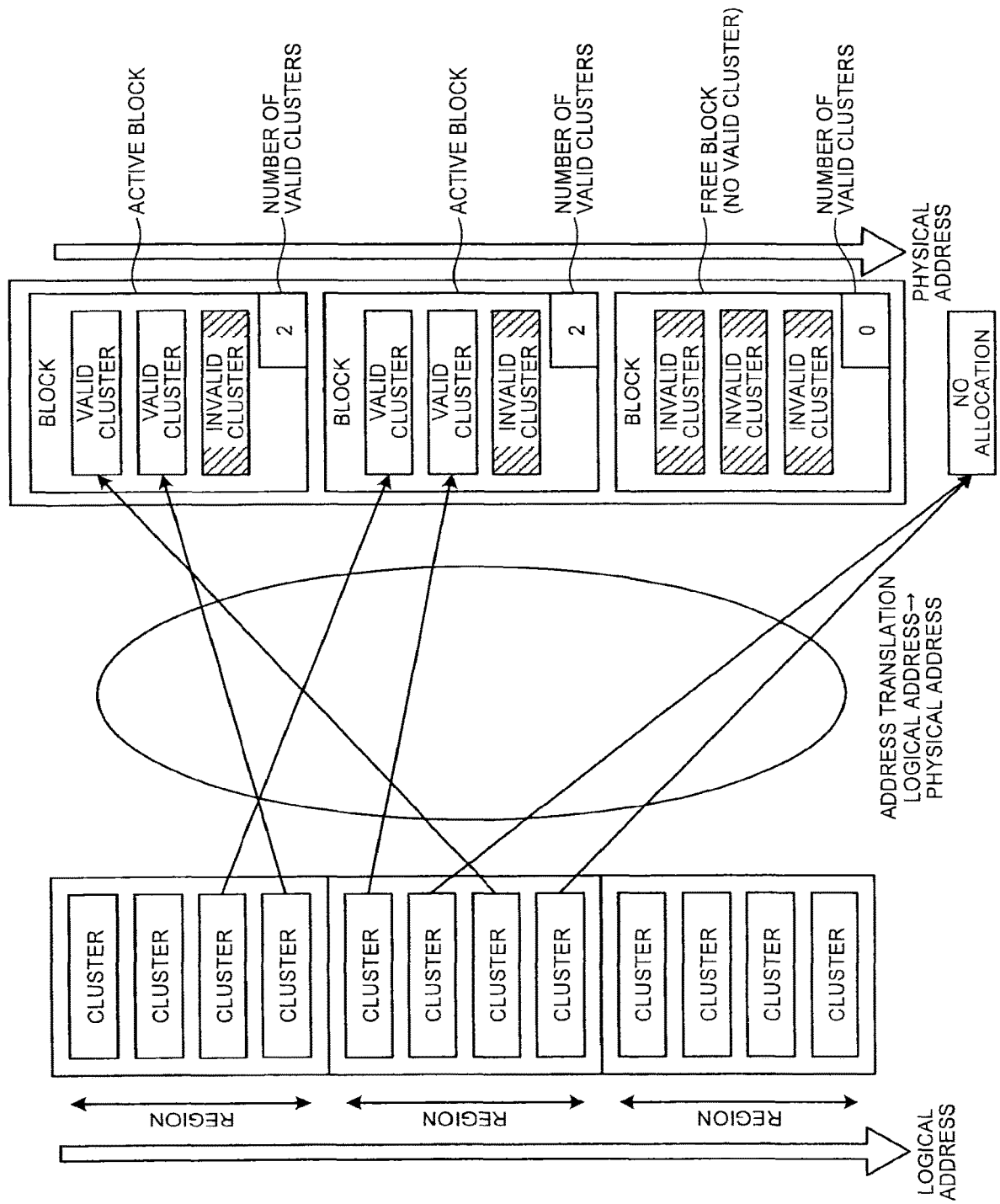
FIG. 3 is a diagram illustrating the relationship between logical addresses and physical addresses in a data storing unit according to the embodiment.
Figure 4:
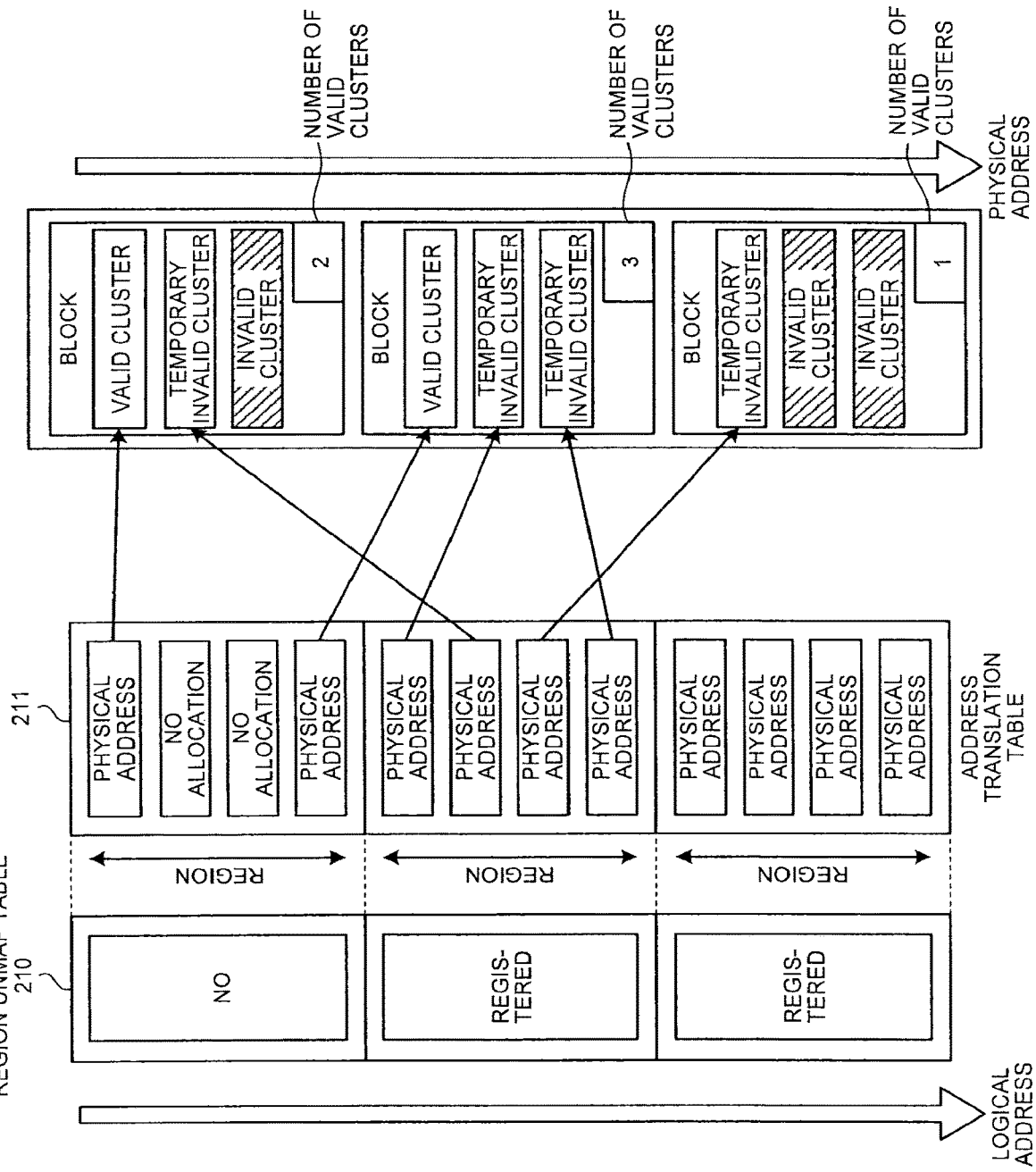
FIG. 4 is a diagram illustrating the relationship between an address translation table, a region UNMAP table, and physical addresses according to the embodiment.

FIG. 2 is a block diagram illustrating the detailed configuration of the address translation unit 111. FIG. 3 is a diagram illustrating the relationship between logical addresses and physical addresses in the data storing unit 110 that are associated with each other in the address translation table, which will be described later. FIG. 4 is a diagram illustrating the relationship between the address translation table, the region UNMAP table, which will be described later, and physical addresses in the data storing unit 110. The dashed arrows indicate that the component at the starting point of the arrow refers to or changes data of the component at the destination of the arrow.

The address translation unit 111 manages registration per region, which is a range larger than a cluster, which is a unit in address translation. A region UNMAP managing unit 220 includes a region UNMAP table 210, a region UNMAP valid bit 212, a reservation receiving unit 213, and a region-UNMAP registration determining unit 214. Registration of a target area for the UNMAP command is performed per region. The region UNMAP table 210 is a table composed of components that are equal in number to the regions. The region UNMAP table 210 stores information that indicates whether each region is registered. The region UNMAP table 210 is stored, for example, in a DRAM. The region UNMAP valid bit 212 (valid information storing unit) stores a state that indicates whether there is a region that is registered in the region UNMAP table 210. In other words, the region UNMAP valid bit 212 stores information that indicates whether at least one region is registered or no region is registered. When the address resolution or address update is performed, it is necessary to check whether a target area therefor is registered. If it is determined early that no region is registered, it is not necessary to perform a checking process of checking whether a region is registered in the region UNMAP table 210 for each region by searching the region UNMAP table 210; therefore, the address resolution and address update can be performed quickly. Because the size of the region UNMAP valid bit 212 is small, the region UNMAP valid bit 212 is stored, for example, in an SRAM or a register in hardware. An UNMAP process receiving unit 201 receives a region (Region) UNMAP command issued by the UNMAP command processing unit 105, registers a region (invalidation registration region) to be invalidated in the region UNMAP table 210, and returns a completion notification. The region UNMAP command is a command requesting a region UNMAP that is the invalidation for each region. An address translation table 211 is composed of components that are equal in number to the logical addresses. A physical address is stored in each component. A physical address corresponding to a logical address can be obtained by using the address translation table 211. The address translation table 211 is stored, for example, in a DRAM. An address resolution unit 202 obtains a physical address from a logical address by using the region UNMAP valid bit 212, the region UNMAP table 210, and the address translation table 211 and returns it to a user. An address updating unit 203 performs the address update, i.e., updates the address translation table 211, by using the region UNMAP table 210 and the address translation table 211. A sequential UNMAP processing unit 204 requests an internal processing unit 205 to invalidate registered regions in a predetermined order. This order may be a descending order of logical addresses or an ascending order thereof. The internal processing unit 205 invalidates each cluster of a specified region. When all the clusters in one region are invalidated, the region UNMAP table 210 is updated. A plurality of the above processes are not performed at the same time in the SSD 50. An on-demand UNMAP processing unit 206 requests the internal processing unit 205 to perform the invalidation on demand. The on-demand UNMAP processing unit 206 is invoked by the address updating unit 203 and a compaction address resolution unit 207 to operate the internal processing unit 205. The compaction address resolution unit 207 performs the address resolution in the compaction. For example, while the SSD 50 (the address translation unit 111) is operating, a valid cluster counter 230 is loaded on the DRAM or the SRAM in the address translation unit 111. When the power of the SSD is off, the valid cluster counter 230 is stored in the data storing unit 110.

In the background process for the UNMAP command, the invalidation for each cluster is performed on each cluster in a region registered in the region UNMAP table 210. When there is a request to perform the address update on a region on which the region UNMAP is being performed, the region UNMAP is preferentially performed by requesting the region UNMAP managing unit 220 to perform the region UNMAP process, and thereafter the address update is performed.

When there is a request to perform the address resolution, a check is made as to whether registration is made in the region UNMAP table 210 by referring to the region UNMAP valid bit 212. When registration is made, the region UNMAP table 210 is referred to. When a target for the address resolution is registered, a value that indicates invalidation is returned. Otherwise, the address resolution is performed by referring to the address translation table 211.

Figure 5:
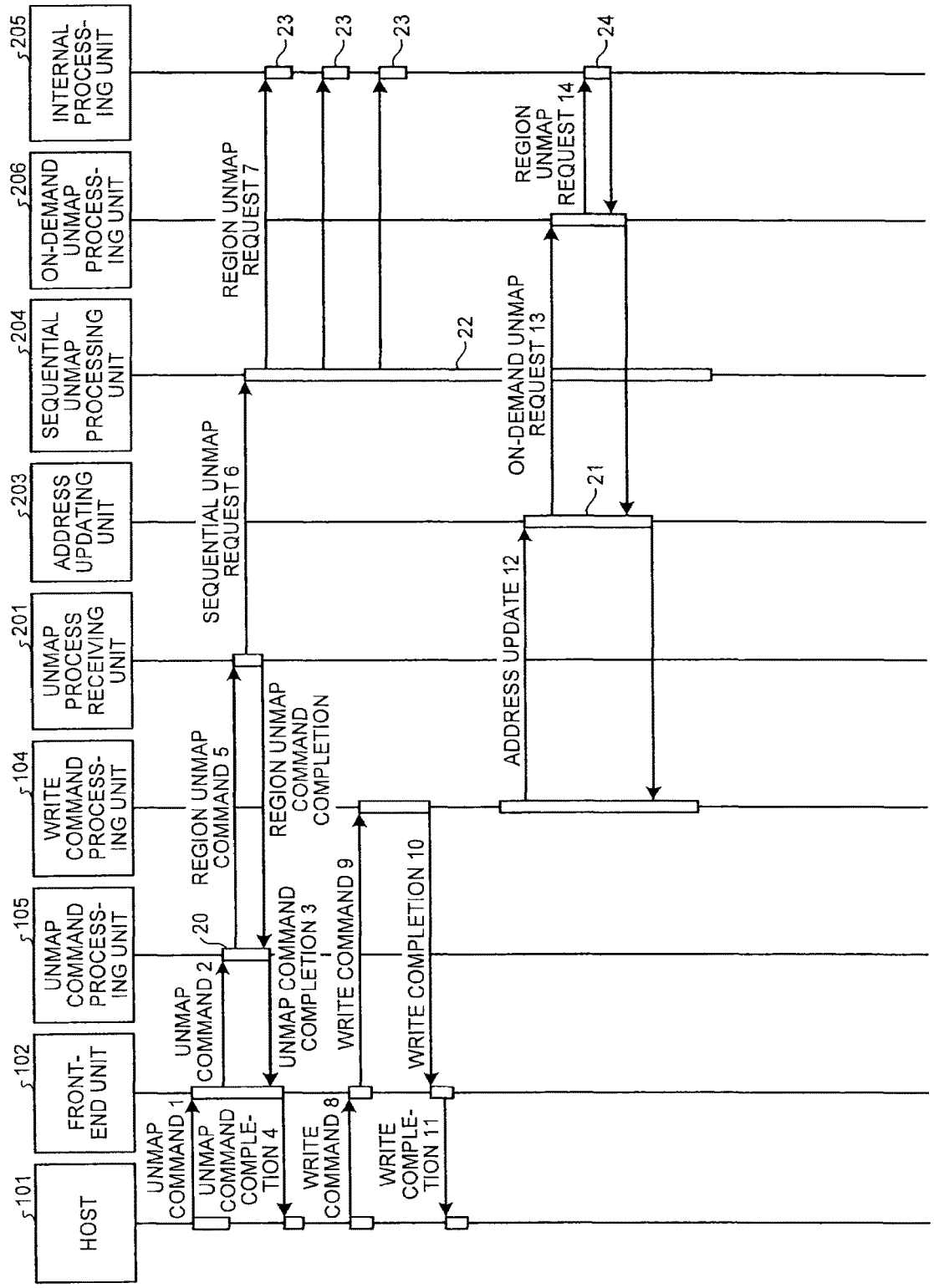
FIG. 5 is a diagram illustrating an operation sequence of the host and the SSD according to the embodiment.

FIG. 5 illustrates the operation sequence of the host 101 and the SSD 50 according to the present embodiment. When an UNMAP command 1 for a wide range is input to the front-end unit 102 from the host 101, the front-end unit 102 issues an UNMAP command 2 to the UNMAP command processing unit 105. The UNMAP command processing unit 105 issues a region UNMAP command 5 to the UNMAP process receiving unit 201 in accordance with the UNMAP command 2. The region of the logical addresses to be invalidated by the region UNMAP command 5 is registered in the region UNMAP table 210. After the region UNMAP command 5 is issued, the UNMAP command processing unit 105 sends an UNMAP command completion 3 to the front-end unit 102. Processing time 20 indicates the time required for performing the process for the UNMAP command 2 by the UNMAP command processing unit 105. The UNMAP process receiving unit 201 issues a request to perform the invalidation in the background to the sequential UNMAP processing unit 204. The invalidation performed in the background is referred to as a sequential UNMAP. In other words, the UNMAP process receiving unit 201 requests the sequential UNMAP processing unit 204 to start the sequential UNMAP (sequential UNMAP request 6). The sequential UNMAP is the invalidation process performed in the order of logical addresses. This order may be a descending order of logical addresses or an ascending order thereof.

The sequential UNMAP processing unit 204 requests the internal processing unit 205 to perform the region UNMAP that is the invalidation for each region (region UNMAP request 7). As described above, the order in which the regions are requested to be invalidated may be any of a descending order or an ascending order of included logical addresses as long as it is predetermined. In response to this request, the internal processing unit 205 performs the region UNMAP on one region. The region UNMAP request is performed for the registered regions. The internal processing unit 205 takes processing time 23 to invalidate one region. The sequential UNMAP processing unit 204 takes processing time 22 to perform the sequential UNMAP.

After the UNMAP command completion 4 is received, the host 101 can input, for example, a WRITE command 8 to the SSD 50 as a command subsequent to the UNMAP command 1. The front-end unit 102 that has received the WRITE command 8 inputs a WRITE command 9 to the WRITE command processing unit 104. The WRITE command processing unit 104 sends a WRITE completion 10 to the front-end unit 102 and sends an address update 12 to the address updating unit 203. The front-end unit 102 that has received the WRITE completion 10 sends a WRITE completion 11 to the host 101. When a region that includes the logical address that is a target for the WRITE command 9 is registered in the region UNMAP table 210, the address updating unit 203 that has received the address update 12 requests the on-demand UNMAP processing unit 206 to perform an on-demand UNMAP (on-demand UNMAP request 13). The on-demand UNMAP is a request to invalidate a region specified by the WRITE command 8 or the like, which is a command subsequent to the UNMAP command, on demand. The invalidation of a region by the request for the on-demand UNMAP is performed preferentially over the invalidation of a region by the request for the sequential UNMAP.

The address updating unit 203 that has received the address update 12 performs the address update over processing time 21. In the case where, although a region that includes a logical address of a write target is registered in the region UNMAP table 210, the invalidation of the region that is the target region has not been completed, the address updating unit 203 issues the on-demand UNMAP request 13 to the on-demand UNMAP processing unit 206. The on-demand UNMAP processing unit 206 that has received the on-demand UNMAP request 13 preferentially requests the internal processing unit 205 to perform the region UNMAP that is the invalidation for each region (region UNMAP request 14). As described above, the invalidation of a region by the request for the on-demand UNMAP is performed preferentially over the invalidation of a region by the request for the sequential UNMAP. The internal processing unit 205 takes processing time 24 for the invalidation of a region requested by the on-demand UNMAP.

The detailed operation of the function blocks described above will be explained below.

Figure 6:
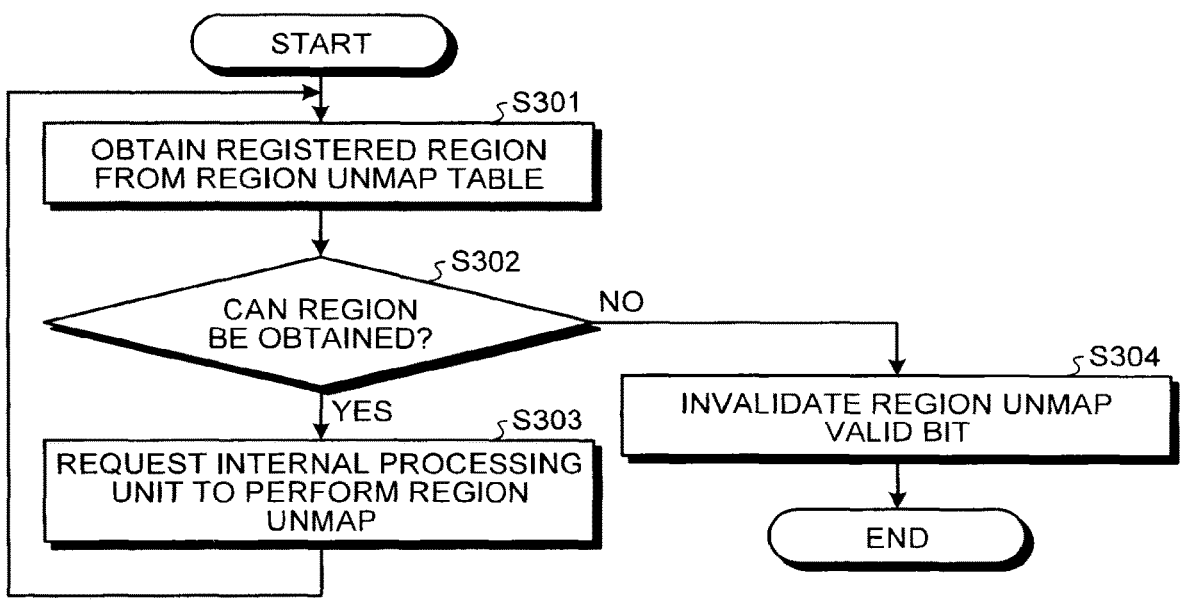
FIG. 6 is a flowchart illustrating a process of a sequential UNMAP by a sequential UNMAP processing unit according to the embodiment.

FIG. 6 is a flowchart illustrating a process of the sequential UNMAP by the sequential UNMAP processing unit 204. The sequential UNMAP processing unit 204 extracts information on a registered region from the region UNMAP table 210 and requests the internal processing unit 205 to perform the process. First, in Step S301, the sequential UNMAP processing unit 204 obtains one registered region from the region UNMAP table 210. Next, in Step S302, it is determined whether a region can be obtained in Step S301. When a region can be obtained (Yes in Step S302), the sequential UNMAP processing unit 204 requests the internal processing unit 205 to perform the region UNMAP on the obtained region (Step S303). After Step S303, the process returns to Step S301 and the sequential UNMAP processing unit 204 obtains the next region from the region UNMAP table 210. In this manner, in the sequential UNMAP process, the invalidation process is performed on a region (invalidation registration region) of a logical address specified by the UNMAP command in a predetermined order in accordance with a region, a logical address, or the like. When a region cannot be obtained in Step S301 (No in Step S302), in Step S304, the sequential UNMAP processing unit 204 invalidates the region UNMAP valid bit 212 to indicate that the region UNMAP table 210 does not need to be referred to and ends the process. When the UNMAP process receiving unit 201 receives the region (Region) UNMAP command issued by the UNMAP command processing unit 105, the reservation is performed, and the sequential UNMAP processing unit 204 is not performing the sequential UNMAP process, the above process is started. When the sequential UNMAP processing unit 204 has finished requesting the internal processing unit 205 to perform the region UNMAP on all the registered regions, the sequential UNMAP processing unit 204 ends the process. If the power fails during the sequential UNMAP process, information on a region of an uncompleted portion of the invalidation is stored and, when the power is restarted, the stored information on the region of the uncompleted portion is restored and the sequential UNMAP process is resumed.

Figure 7:
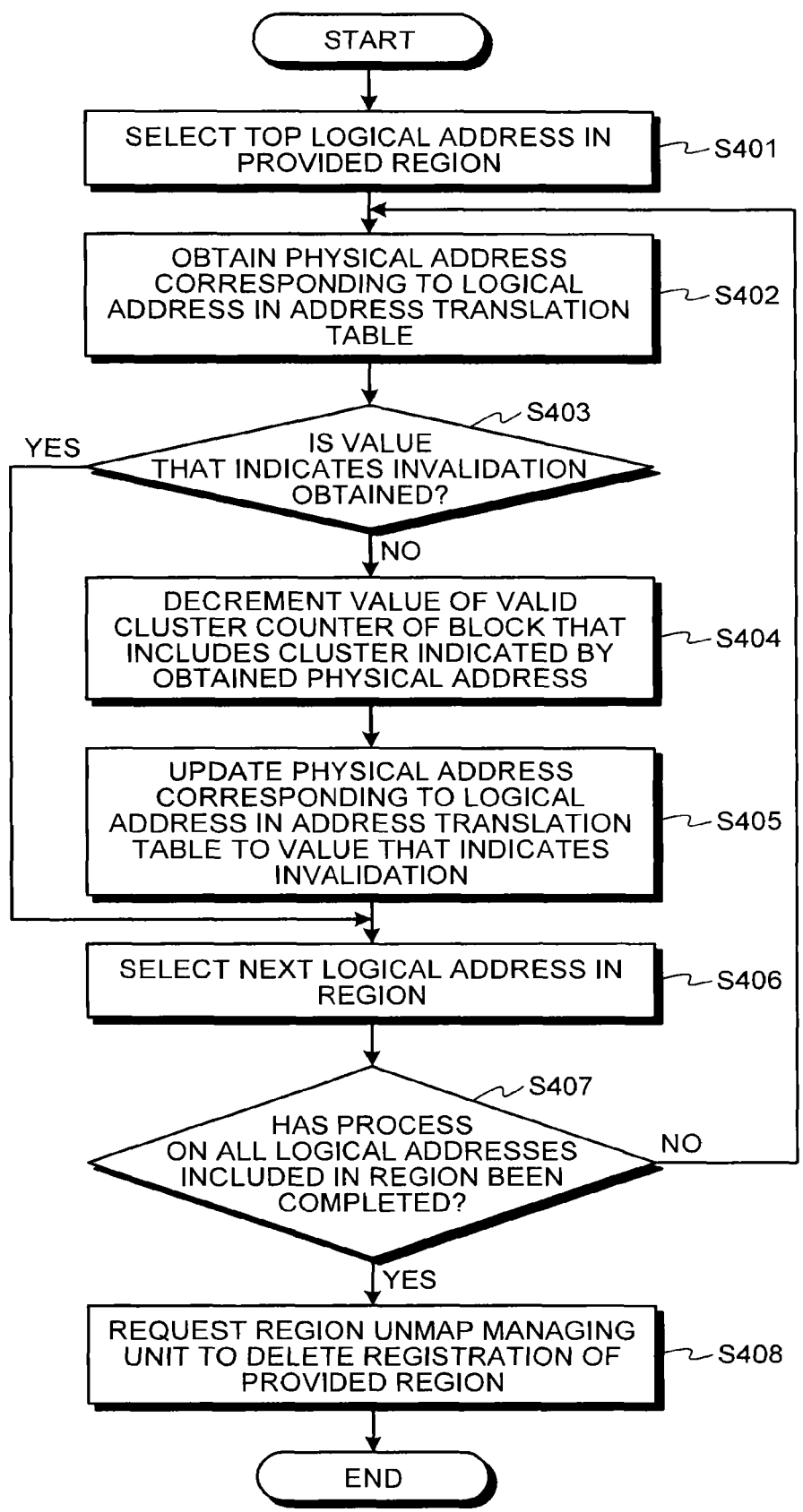
FIG. 7 is a flowchart illustrating a process of a region UNMAP by an internal processing unit according to the embodiment.

FIG. 7 is a flowchart illustrating a process of the region UNMAP by the internal processing unit 205 performed in Step S303 in FIG. 6. The internal processing unit 205 performs the invalidation of a region. The internal processing unit 205 receives a request to perform the invalidation for one region from the sequential UNMAP processing unit 204, the on-demand UNMAP processing unit 206, the address resolution unit 202, and the address updating unit 203, and performs the invalidation process. Only one internal processing is being performed in the SSD 50.

First, a top logical address in the region provided to the internal processing unit 205 is selected (Step S401). Next, the physical address corresponding to the logical address in the address translation table 211 is obtained (Step S402). It is determined whether a value that indicates invalidation is obtained for the logical address (Step S403). When a value that indicates invalidation is obtained (Yes in Step S403), the process proceeds to Step S406. When the physical address is obtained (No in Step S403), the valid cluster counter 230 of the block that includes the cluster indicated by the obtained physical address is decremented by one (Step S404). Then, the physical address corresponding to the logical address in the address translation table 211 is updated to a value that indicates invalidation (Step S405). Then, the next logical address in the region provided to the internal processing unit 205 is selected (Step S406). It is determined whether the process on all the logical addresses included in the region provided to the internal processing unit 205 has been completed (Step S407). When the process on all the logical addresses has been completed (Yes in Step S407), the internal processing unit 205 requests the region UNMAP managing unit 220 to delete the registration of the provided region from the region UNMAP table 210 (Step S408).

Next, the process by the UNMAP command processing unit 105 will be explained. The host 101 specifies the range that is invalidated per sector address by the UNMAP command 1 with respect to the front-end unit 102. The front-end unit 102 issues a command to invalidate, per sectors, a portion that is not aligned as a region and performs a conventional UNMAP process. Thereafter, the front-end unit 102 issues the UNMAP command 2 to the UNMAP command processing unit 105 by the method according to the present embodiment for a area that is aligned as a region.

Figure 8:
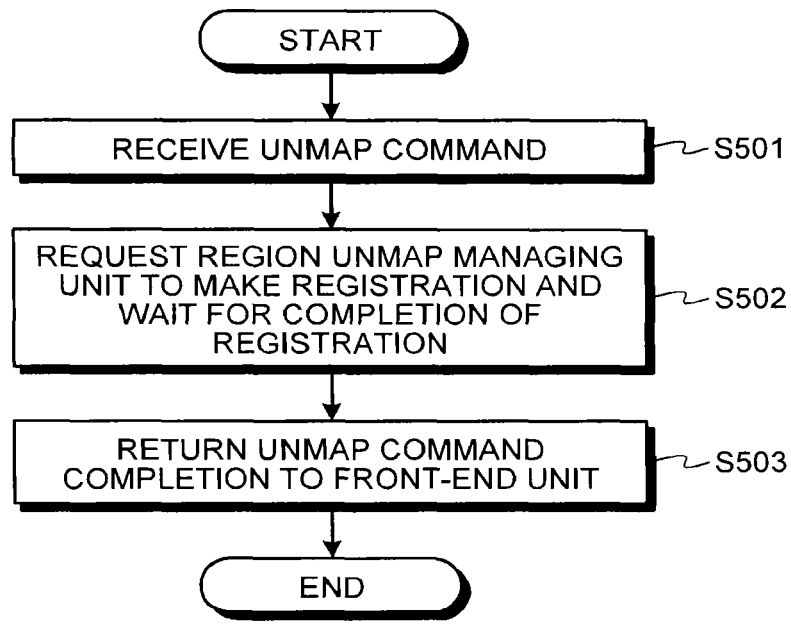
FIG. 8 is a flowchart illustrating an operation of an UNMAP command processing unit when a area that is aligned as a region is invalidated according to the embodiment.

FIG. 8 is a flowchart explaining an operation of the UNMAP command processing unit 105 when a area that is aligned as a region is invalidated. Immediately after the UNMAP command processing unit 105 issues the region UNMAP command 5 to the UNMAP process receiving unit 201, the UNMAP command processing unit 105 returns the UNMAP command completion 3 to the front-end unit 102. The UNMAP process receiving unit 201 that has received the region UNMAP command 5 sets the region as an entry in the region UNMAP table 210.

First, in Step S501, the UNMAP command processing unit 105 receives the UNMAP command 2. Thereafter, the UNMAP command processing unit 105 issues the region UNMAP command 5 to the UNMAP process receiving unit 201. In Step S502, the UNMAP process receiving unit 201 that has received the region UNMAP command 5 from the UNMAP command processing unit 105 requests the region UNMAP managing unit 220 to register the region that is a target for the invalidation and waits for the completion of the registration. In Step S503, the UNMAP command processing unit 105 returns the UNMAP command completion 3 to the front-end unit 102.

Before the UNMAP command completion 3 is returned after the front-end unit 102 issues the UNMAP command 2, if the READ command or the WRITE command is issued with respect to the region to be invalidated, the front-end unit 102 delays issuance of the READ command or the WRITE command to the READ command processing unit 103 or the WRITE command processing unit 104 in accordance with the READ command or the WRITE command until the UNMAP command completion 3 is returned.

Figure 9:
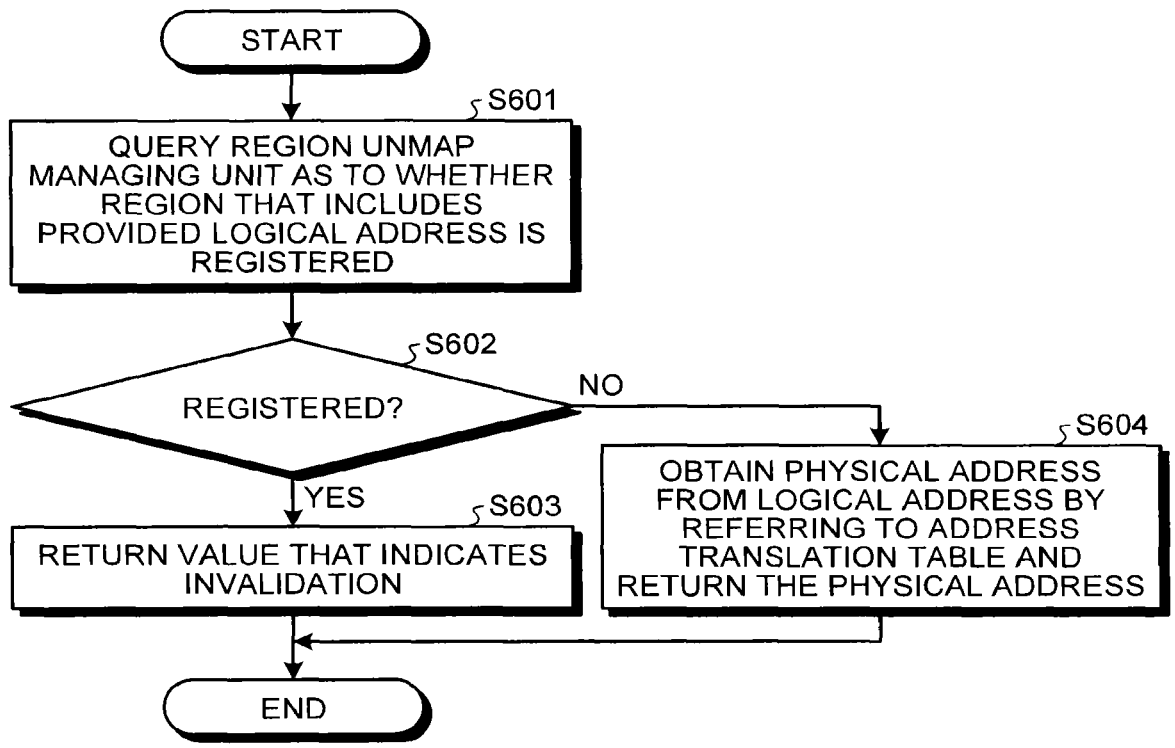
FIG. 9 is a flowchart illustrating a process by an address resolution unit according to the embodiment.

FIG. 9 is a flowchart illustrating a process by the address resolution unit 202 that operates, for example, when the READ command is issued. When a logical address that needs to be resolved is provided, the address resolution unit 202 returns a physical address. First, the address resolution unit 202 queries the region UNMAP managing unit 220 as to whether the region that includes the logical address that is an address resolution target is registered (Step S601). In Step S602, it is determined whether the region is registered. When the corresponding region is registered in the region UNMAP table 210 (Yes in Step S602), a value that indicates invalidation is returned (Step S603). When the corresponding region is not registered (No in Step S602), the address resolution unit 202 obtains the physical address corresponding to the provided logical address by referring to the address translation table 211 and returns the physical address (Step S604).

Figure 10:
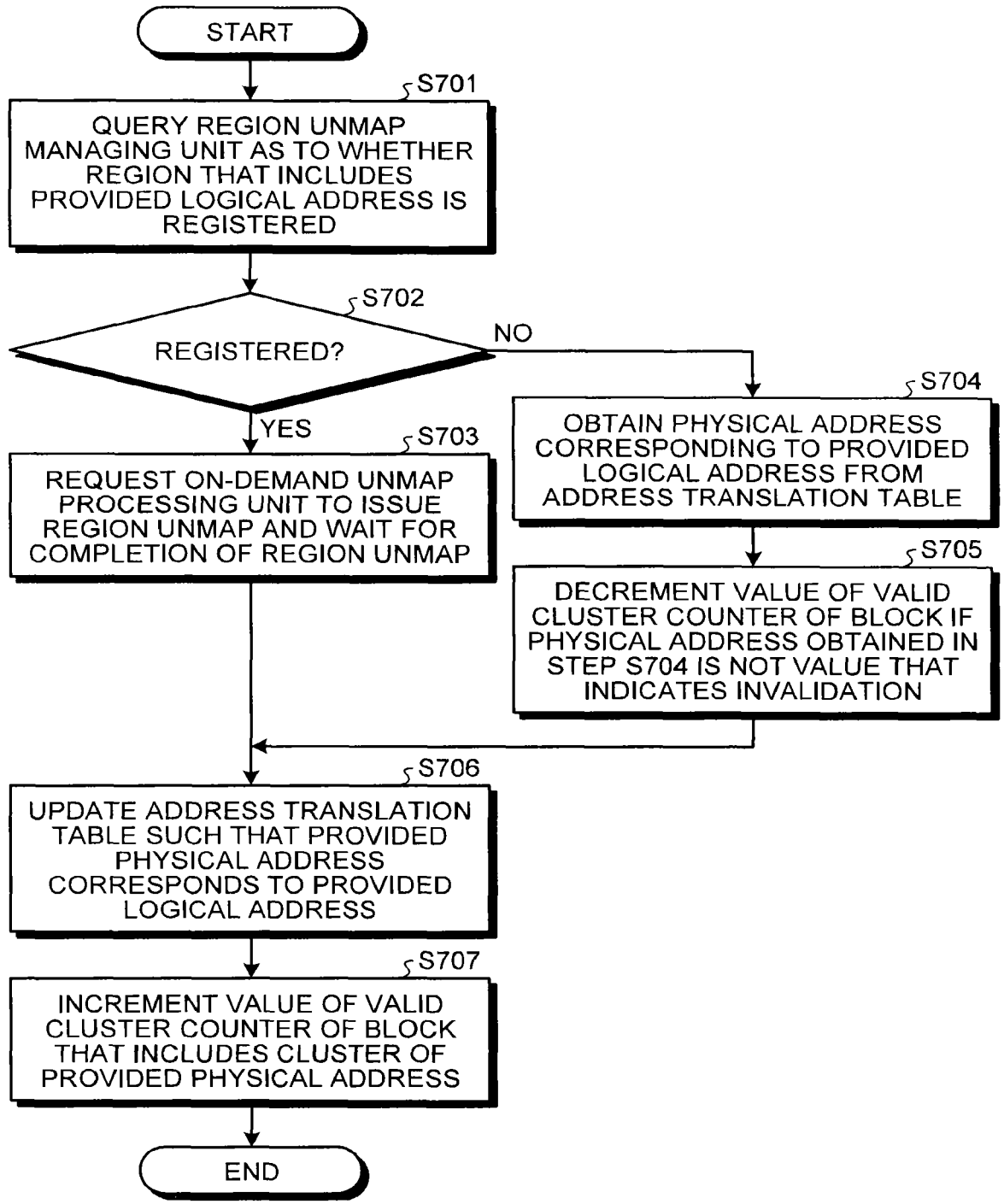
FIG. 10 is a flowchart illustrating a process by an address updating unit according to the embodiment.

FIG. 10 is a flowchart illustrating a process by the address updating unit 203. The address updating unit 203 sets a logical address and a physical address of a cluster to be updated as parameters. The address updating unit 203 queries the region UNMAP managing unit 220 as to whether the region that includes the provided logical address is registered (Step S701). When the corresponding region is registered in the region UNMAP table 210 (Yes in Step S702), the process proceeds to Step S703. Then, the address updating unit 203 requests the on-demand UNMAP processing unit 206 to perform the invalidation (region UNMAP) on the corresponding region and waits for the completion thereof. The invalidation by this request is performed preferentially over the invalidation of a region by the request for the sequential UNMAP. When the region is not registered (No in Step S702), the process proceeds to Step S704 and the physical address corresponding to the provided logical address is obtained from the address translation table 211. Furthermore, if the physical address obtained by referring to the address translation table 211 in Step S704 is not a value that indicates invalidation, the value of the valid cluster counter 230 of the block that includes the cluster of the physical address is decremented by one (Step S705). After Steps S703 and S705, the process proceeds to Step S706, and the address translation table 211 is updated such that the provided physical address corresponds to the provided logical address. Thereafter, the value of the valid cluster counter 230 of the block that includes the cluster of the provided physical address is incremented by one (Step S707).

Figure 11:
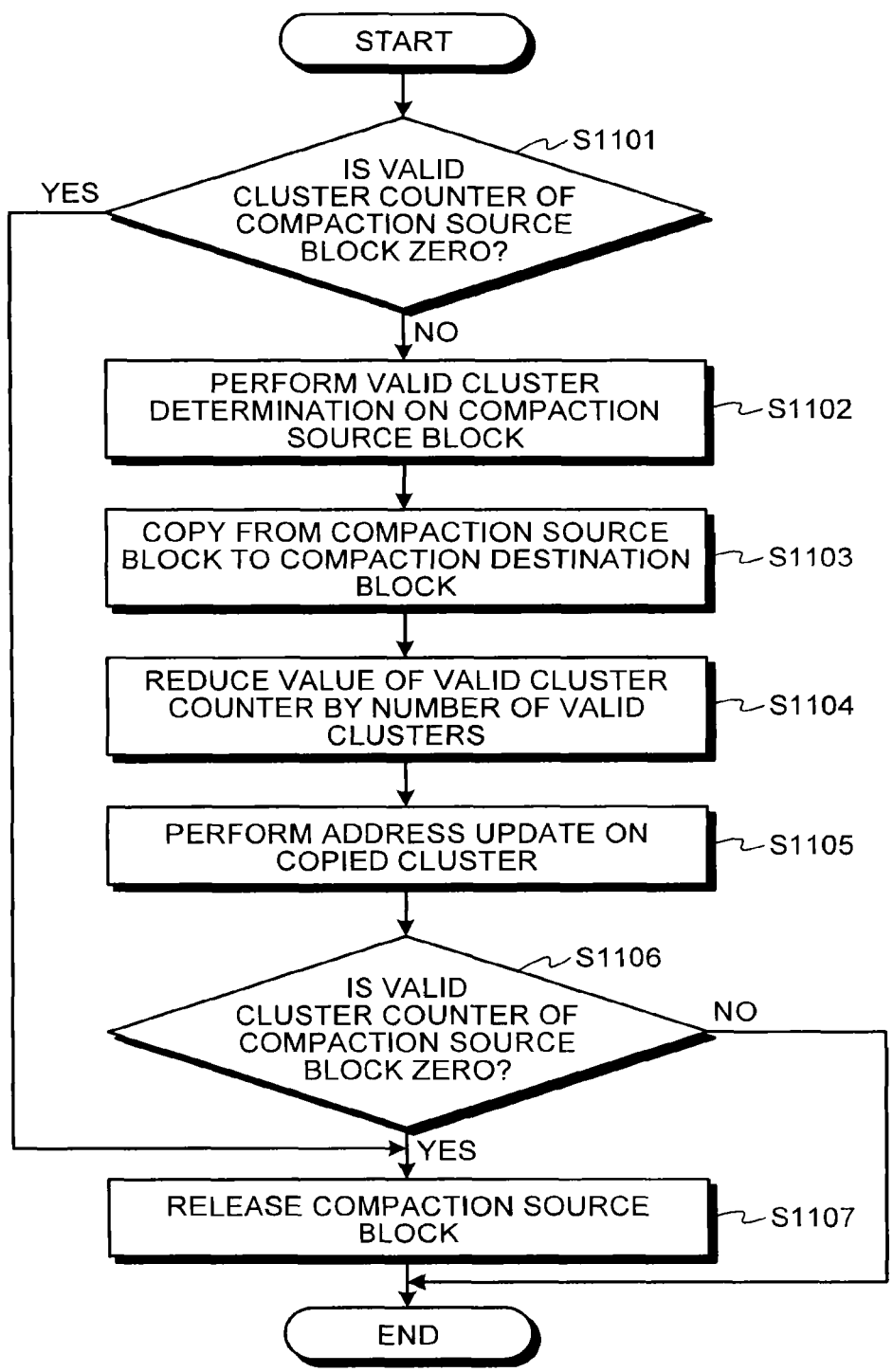
FIG. 11 is a flowchart illustrating an operation of a compaction process according to the embodiment.

In the SSD 50, in order to prevent free blocks from being exhausted, the compaction processing unit 106 performs the compaction process of collecting information on valid clusters in a block and copying them to a different block. FIG. 11 illustrates a flowchart explaining an operation of moving data from a compaction source block to a compaction destination block in the compaction process.

First, it is determined whether the valid cluster counter 230 of a compaction source block is zero (Step S1101). When the valid cluster counter 230 is not zero (No in Step S1101), the valid cluster determination is performed on the compaction source block (Step S1102). Next, a cluster that is determined to be a valid cluster is copied to a compaction destination block from the compaction source block (Step S1103). Next, the value of the valid cluster counter 230 is reduced by the number of valid clusters (Step S1104). As illustrated in FIG. 4, the value of the valid cluster counter 230 stores the number of clusters referred to by the address translation table 211, i.e., the sum of the number of valid clusters and the number of temporary invalid clusters. Accordingly, when there is no temporary invalid cluster, the value of the valid cluster counter 230 becomes zero in Step S1104; however, when a temporary invalid cluster is present, the value of the valid cluster counter 230 does not become zero. Then, the address update is performed on the clusters copied in Step S1103 (Step S1105). Then, it is determined again whether the valid cluster counter 230 of the compaction source block is zero (Step S1106). When the valid cluster counter 230 is not zero (No in Step S1106), i.e., when a temporary invalid cluster is present, the compaction source block is not released and the process ends. When the valid cluster counter 230 is zero (Yes in Step S1106), the compaction source block is released such that it becomes a free block (Step S1107). Moreover, in Step S1101, when the valid cluster counter 230 is zero (Yes in Step S1101), the compaction source block is released (Step S1107).

Figure 12:
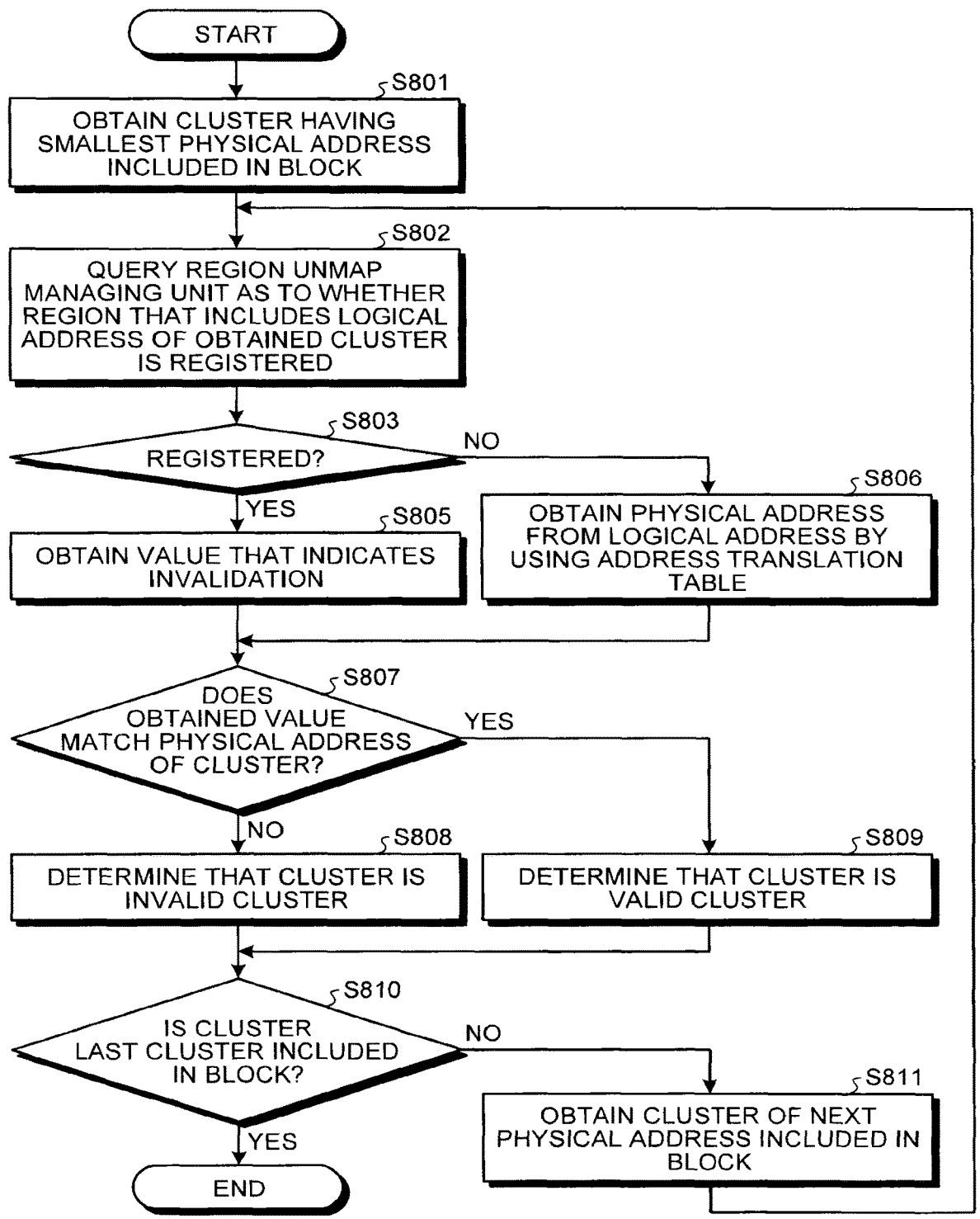
FIG. 12 is a detailed flowchart of a valid cluster determination with respect to a compaction source block according to the embodiment.

FIG. 12 illustrates a detailed flowchart of the valid cluster determination with respect to a compaction source block performed in Step S1102. First, a cluster having the smallest physical address included in a provided block is obtained (Step S801). A block stores logs that indicate a logical address corresponding to each cluster in the block. Accordingly, the logical address of the obtained cluster is obtained. Then, the region UNMAP managing unit 220 is queried as to whether the region that includes the logical address of the obtained cluster is registered in the region UNMAP table 210 (Step S802). When the region is registered (Yes in Step S803), a value that indicates invalidation is obtained (Step S805). In other words, the cluster obtained in Step S801 is a temporary invalid cluster of an invalid cluster. When the region is not registered (No in Step S803), a physical address is obtained from the logical address by referring to the address translation table 211 (Step S806). After Steps S805 and S806, it is determined whether the obtained value matches the physical address of the cluster obtained in Step S801 (Step S807). When the process moves to Step S807 from Step S805, i.e., when the obtained cluster is a temporary invalid cluster and when the physical address obtained in Step S806 does not match the physical address of the obtained cluster (No in Step S807), it is determined that the obtained cluster is an invalid cluster (Step S808). Accordingly, the case where the obtained cluster is determined to be an invalid cluster also includes the case where the obtained cluster is a temporary invalid cluster. When the physical address obtained in S806 matches the physical address of the obtained cluster (Yes in Step S807), it is determined that the obtained cluster is a valid cluster (Step S809). The process performed when the cluster is determined to be a valid cluster, for example, includes storing the physical address and the logical address of the valid cluster in order to refer to the valid cluster in Step S1103 in FIG. 11 and the like. After Steps S808 and S809, it is determined whether the obtained cluster is the last cluster included in the provided block (Step S810). When the obtained cluster is not the last cluster (No in Step S810), the cluster having the next physical address included in the provided block is obtained (Step S811) and the process proceeds to Step S802. When the obtained cluster is the last cluster, i.e., when the valid cluster determination has been performed on all the clusters included in the block (Yes in Step S810), the process ends.

Figure 13:
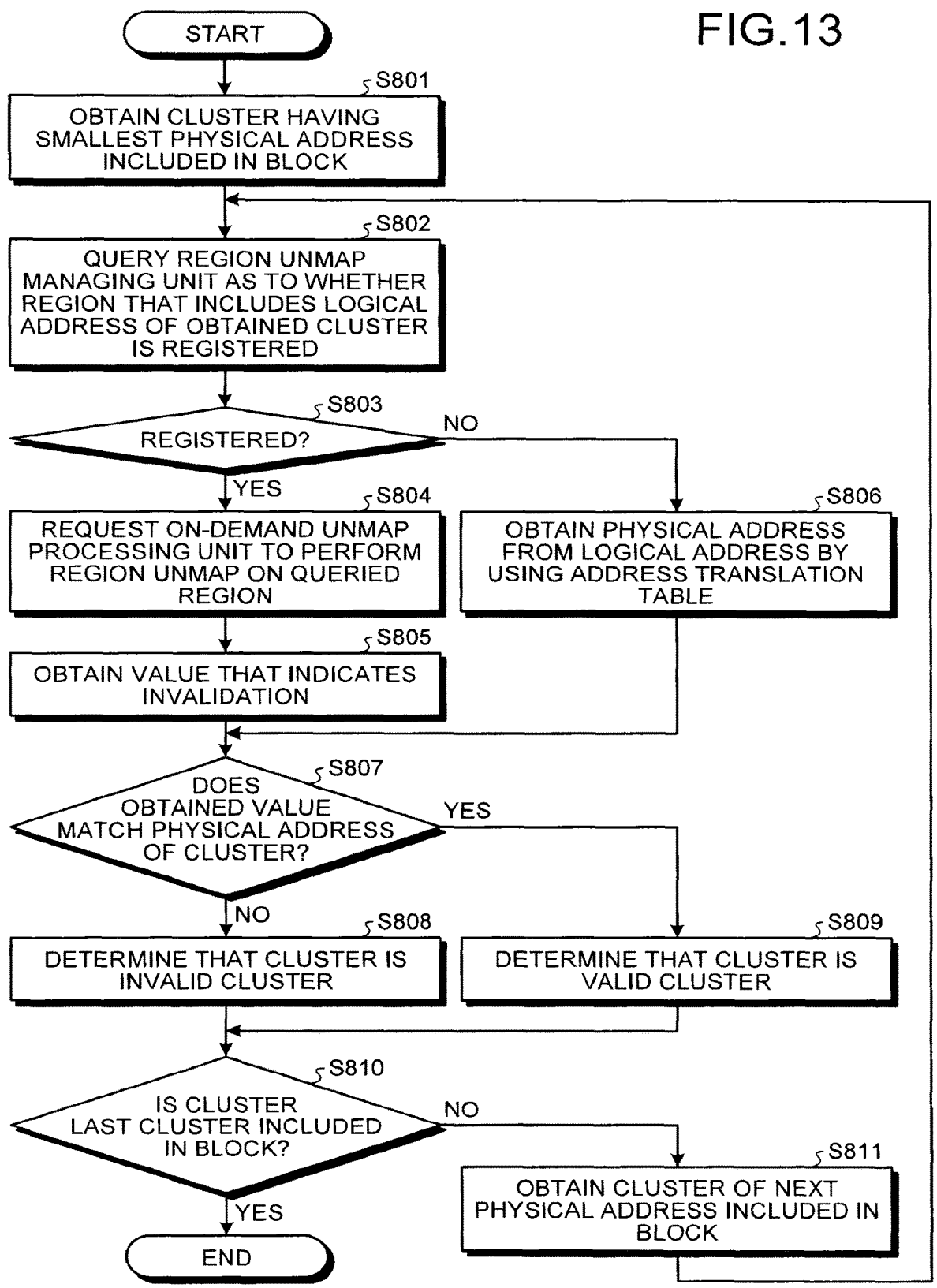
FIG. 13 is a detailed flowchart of a valid cluster determination with execution of an on-demand UNMAP on a compaction source block according to the embodiment.

In the present embodiment, the on-demand UNMAP can be performed in the valid cluster determination. The flowchart in this case is illustrated in FIG. 13. In FIG. 13, Step S804 is added in FIG. 12; however, other processes are the same as those in FIG. 12. In FIG. 13, in Step S803, when the region (compaction target region) that includes the logical address of the obtained cluster is registered in the region UNMAP table 210 (Yes in Step S803), the compaction address resolution unit 207 requests the on-demand UNMAP processing unit 206 to perform the region UNMAP on the region (compaction target region) (Step S804). Then, a value that indicates invalidation is obtained (Step S805). In Step S804, the compaction address resolution unit 207 requests the on-demand UNMAP processing unit 206 to perform the on-demand UNMAP. In response to this, the on-demand UNMAP processing unit 206 requests the internal processing unit 205 to preferentially perform the region UNMAP. As described above, the invalidation of a region by the request for the on-demand UNMAP is performed preferentially over the invalidation of a region by the request for the sequential UNMAP.

When the flowchart in FIG. 12 in which the on-demand UNMAP is not performed in the valid cluster determination is performed, the on-demand UNMAP is requested only when the address update is performed by the WRITE command 8 or the like. In this case, when a compaction source block includes a temporary invalid block, the valid cluster counter of the compaction source block does not become zero in Step S1106 in FIG. 11 (No in Step S1106). Therefore, the compaction source block cannot be released.

In contrast, when the on-demand UNMAP is performed in the valid cluster determination for a compaction source as illustrated in FIG. 13, the region that is invalidated on demand includes a cluster of the compaction source block. Therefore, when the valid cluster determination for the compaction source block (Step S1102 in FIG. 11) ends, a temporary invalid cluster included in the compaction source block is invalidated. Consequently, it is possible to reduce the valid cluster counter 230 by the number of temporary invalid clusters that are invalidated before proceeding to Step S1106 in FIG. 11. Accordingly, it becomes possible to set the valid cluster counter of the compaction source block to zero in Step S1106 in FIG. 11 (Yes in Step S1106). As a result, the compaction source block becomes a free block (Step S1107). Consequently, a free block is generated from the initial stage of the compaction. Moreover, regardless of whether the on-demand UNMAP is performed in the valid cluster determination for a compaction source, when the compaction source block does not include a temporary invalid cluster, the compaction source block becomes a free block in the compaction.

As described above, when the on-demand UNMAP is not performed in the valid cluster determination, the compaction efficiency degrades due to the error in the valid cluster counter in a transient state because of the presence of a temporary invalid cluster. Because an error exists in the valid cluster counter, when the on-demand UNMAP is performed in the valid cluster determination, a large number of free blocks are generated with respect to the same elapsed time period between the start and end of the execution of the sequential UNMAP in the background compared with the case where the on-demand UNMAP is not performed. This state is illustrated in FIG. 14.

Figure 14:
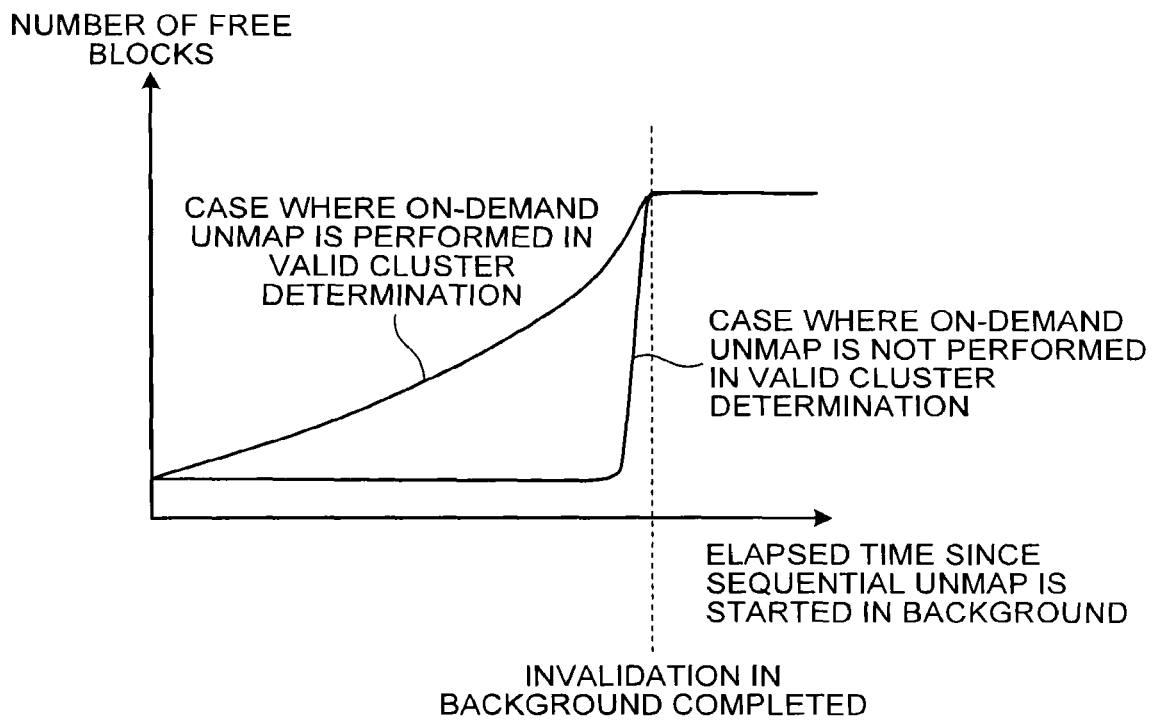
FIG. 14 is a diagram illustrating a state where the number of free blocks is increasing with the progress of the sequential UNMAP in the background according to the embodiment.

As illustrated in FIG. 14, when the invalidation for a wide range is performed in the background by the sequential UNMAP, the number of free blocks increases with the progress of the sequential UNMAP regardless of whether the on-demand UNMAP is performed in the valid cluster determination in the compaction. However, when the on-demand UNMAP is performed in the valid cluster determination (in the case of FIG. 13), a large number of free blocks are generated from the initial stage compared with the case where the on-demand UNMAP is not performed in the valid cluster determination (in the case of FIG. 12).

The response time to the WRITE command in the SSD is affected by the number of free blocks. In the SSD, when the number of free blocks is large, it is not necessary to perform the compaction frequently; therefore, data writing from the host can be performed quickly and thus the response time is reduced. In contrast, when the number of free blocks is small, it is necessary to perform the compaction frequently; therefore, it takes time to perform data writing from the host. According to FIG. 14, when the on-demand UNMAP is performed in the valid cluster determination between the start and end of the execution of the sequential UNMAP, a large number of free blocks are generated with respect to the same elapsed time period compared with the case where the on-demand UNMAP is not performed. Therefore, under the same conditions, the response time to the WRITE command can be reduced by performing the on-demand UNMAP in the valid cluster determination.

As described above, in the present embodiment, the process for the UNMAP command in the memory system is divided into two stages, i.e., the reservation and the background process; therefore, even after the UNMAP command for a wide range is received, another command can be immediately received and performed. Moreover, execution of the invalidation for each region in the background process allows preferential interruption of the invalidation by another command. Furthermore, the on-demand invalidation is preferentially performed in the valid cluster determination when the compaction is performed; therefore, the rate of generating free blocks can be increased and thus the response time to the WRITE command can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory; and
a controller configured to:
in a case that a first logical address is included in a logical address group, perform an unmap process to the first logical address prior to a second logical address, the first logical address being specified by a first command that is received from a host after the controller transmits, to the host, a completion notification of the unmap process for the logical address group and being an address for which the unmap process is not completed, the logical address group being target addresses of the unmap process and including an address for which the unmap process is not completed, the second logical address being an address included in the logical address group and being other than the first logical address and being an address for which the unmap process is not completed,
wherein the controller transmits, to the host, the completion notification of the unmap process for the logical address group even prior to the completion of the unmap process for the logical address group, and wherein
the first command includes a read command, and
the controller transmits a response to the host in response to the read command, the response including information to indicate that data corresponding to the first logical address is unmapped.

2. The memory system according to claim 1, wherein the unmap process includes dissolving a correspondence relationship between each logical address included in the logical address group and a physical address in a first table.

3. The memory system according to claim 1, wherein the logical address group is specified by a second command, the second command being received from the host prior to the first command.

4. The memory system according to claim 1, wherein the first command includes a write command.

5. The memory system according to claim 1, wherein the controller transmits, to the host, the completion notification of the unmap process for the logical address group before the controller completes the unmap process for all of addresses included in the logical address group.

6. The memory system according to claim 1, wherein the controller performs the unmap process in units of region that is obtained by collecting a plurality of consecutive logical addresses.

7. A memory system comprising:
a nonvolatile memory; and
a controller configured to:
in a case that a first logical address is included in a logical address group, perform an unmap process to the first logical address prior to a second logical address, the first logical address being a target address of a compaction process and being an address for which the unmap process is not completed, the logical address group being the target addresses of the unmap process and including an address for which the unmap process is not completed, the second logical address being an address included in the logical address group and being other than the first logical address and being an address for which the unmap process is not completed,
wherein the controller transmits, to a host, a completion notification of the unmap process for the logical address group before the controller starts the compaction process to the first logical address.

8. The memory system according to claim 7, the compaction process includes collecting first data included in a first block in the nonvolatile memory and copying the collected first data to a second block, the first data corresponding to the first logical address.

9. The memory system according to claim 7, wherein the unmap process includes dissolving a correspondence relationship between each logical address included in the logical address group and a physical address in a first table.

10. The memory system according to claim 7, wherein the controller transmits, to the host, the completion notification of the unmap process for the logical address group before the controller completes the unmap process for all of addresses included in the logical address group.

11. The memory system according to claim 7, wherein the controller performs the unmap process in units of region that is obtained by collecting a plurality of consecutive logical addresses.

12. A method of controlling a memory system including a nonvolatile memory, the method comprising:
performing an unmap process for a logical address group; and
transmitting, to a host, a completion notification of the unmap process for the logical address group even prior to completion of the unmap process for the logical address group, wherein
in a case that a first logical address and a second logical address are included in the logical address group, performing the unmap process to the first logical address prior to the second logical address, the first logical address being specified by a first command that is received from the host after transmitting, to the host, the completion notification of the unmap process for the logical address group and being an address for which the unmap process is not completed, the logical address group being target addresses of the unmap process and including addresses for which the unmap process is not completed, the second logical address being other than the first logical address and being an address for which the unmap process is not completed, and wherein
the first command includes a read command, the method further comprising
transmitting a response to the host in response to the read command, the response including information to indicate that data corresponding to the first logical address is unmapped.

13. The method according to claim 12, wherein the unmap process includes dissolving a correspondence relationship between each logical address included in the logical address group and a physical address in a first table.

14. The method according to claim 12, wherein the logical address group is specified by a second command, the second command being received from the host prior to the first command.

15. The method according to claim 12, wherein the first command includes a write command.

16. The method according to claim 12, wherein the transmitting the completion notification includes transmitting, to the host, the completion notification of the unmap process for the logical address group before completion of the unmap process for all of addresses included in the logical address group.

17. The method according to claim 12, wherein the performing the unmap process includes performing the unmap process in units of region that is obtained by collecting a plurality of consecutive logical addresses.

* * * * *